R. M. McMAHAN & J. B. MAUGER.
LOCK FOR AUTOMOBILES.
APPLICATION FILED JULY 17, 1916.
1,221,882.
Patented Apr. 10, 1917.
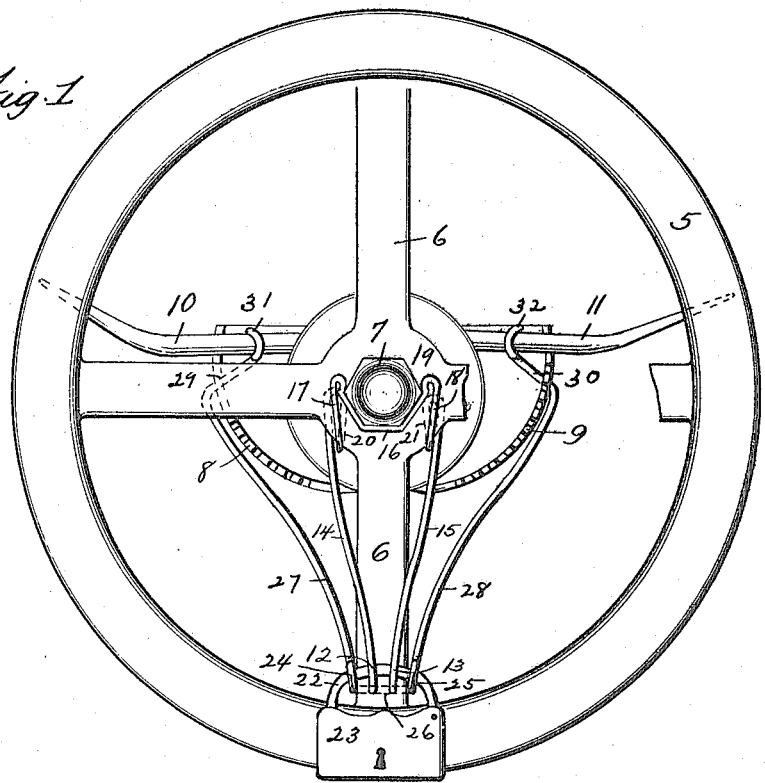
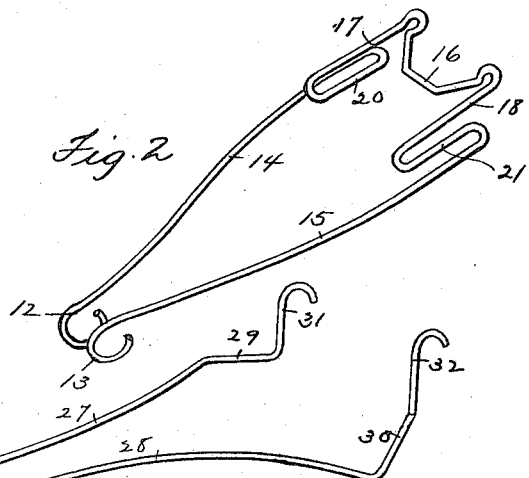
Witness
E. M. Stockman
Inventors
R. M. McMahan
and John B. Mauger
By Shephed & Campbell
Attorneys

UNITED STATES PATENT OFFICE.

ROBERT M. McMAHAN AND JOHN B. MAUGER, OF POTTS GROVE, PENNSYLVANIA.

LOCK FOR AUTOMOBILES.

1,221,882. Specification of Letters Patent. Patented Apr. 10, 1917.

Application filed July 17, 1916. Serial No. 109,740.

*To all whom it may concern:*

Be it known that we, ROBERT M. McMAHAN and JOHN B. MAUGER, citizens of the United States of America, residing at Potts Grove, in the county of Northumberland and State of Pennsylvania, have invented certain new and useful Improvements in Locks for Automobiles, of which the following is a specification.

This invention relates to locks for automobiles and it has for its object the provision of a simple and inexpensive means whereby the spark and throttle levers of an automobile may be locked against movement and the steering wheel may be locked against removal from its post while necessitating the employment of but a single lock.

Further objects and advantages of the invention will be set forth in the detailed description which now follows.

In the accompanying drawing

Figure 1 is a plan view of an automobile steering wheel showing the invention in position.

Fig. 2 is a perspective view of the steering wheel locking means, and

Fig. 3 is a perspective view of the locking means for the spark and throttle levers.

Like numerals designate corresponding parts in all of the figures of the drawing.

Referring to the drawing 5 designates the rim and 6 the spokes of the steering wheel. 7 designates the nut commonly employed for securing the steering wheel in position upon the steering post. 8 and 9 designate the spark and throttle segments and 10 and 11, the spark and throttle levers operable in the usual way over said segments. It has been found that some of the locks heretofore devised for the purpose of locking an automobile against theft have failed to serve their purpose because they relied upon engagement with the under side of the steering wheel. In such cases thieves have removed the steering wheel and have then readily displaced said lock. In carrying out the present invention we provide a member for locking the steering wheel against removal, said member being made of steel wire so that it cannot readily be cut. This wheel locking member is formed of a single and continuous piece of wire and is best illustrated in Fig. 2. By referring to Fig. 2 it will be seen that the wheel locking member has its terminal ends bent to form eyes 12 and 13. The wire of which the member is formed extends forwardly from the eyes 12 and 13 forming the portions 14 and 15. Its bight portion is bent to form an angular socket 16 which conforms to the shape of the nut 7 and is adapted to engage the latter as illustrated in Fig. 1. From the socket 16 the wire is bent rearwardly at 17 and 18 to form portions overlying the hub 19 of the steering wheel. The wire is then bent forwardly at 20 and 21, to form portions adapted to engage beneath the hub of the steering wheel. And from the portions 20 and 21, the wire is bent to connect with the portions 14 and 15.

It will, therefore, be seen that when this steel locking device is in position, the socket 16 engages the nut 7 and prevents the nut from turning. The portions 17 and 18 overlie the comparatively thin center or hub 19 of the steering wheel and the portions 20 and 21 project forwardly beneath said center or hub. The portions 14 and 15 extend rearwardly along one of the spokes 6 of the steering wheel and the eyes 12 and 13 project downwardly above said spoke in position to be engaged by the shackle 22 of a padlock 23. This shackle 22 also extends through loops 24 and 25 of the spark and throttle lever locking device shown in Fig. 3. Loops 24 and 25 are connected by a depending loop 26. This depending loop lies beneath the spoke 6 and the loops 24 and 25 project above the spoke 6. The loop 26 prevents the upward movement of the lock and the fact that the shackle 22 lies above the spoke prevents the downward movement of the lock and the parts engaged thereby. From the loops 24 and 25, the wire from which the spark and throttle lever locking device is made, extends forwardly at 27 and 28. At the forward ends of the portions 27 and 28 inwardly and forwardly directed bends 29 and 30 are formed and these bends terminate in upwardly extending, forwardly directed hooks 31 and 32. These hooks 31 and 32 engage over the spark and throttle levers 10 and 11, respectively, and the bends 29 and 30 pass beneath the segments 8 and 9, respectively. Consequently, the single act of passing the shackle 22 through loop 24, eyes 12 and 13 and loop 25 secures the steering wheel against removal and the spark and throttle levers against movement.

If the owner or driver of an automobile turns the front wheels of the same sharply toward the curb and then places this locking device in position, it will be impossible for the car to be stolen because the steering wheel is locked against movement by which the car could be steered. It is locked against removal from the steering post and the spark and throttle levers are locked against manipulation.

While the elements shown and described are well adapted to serve the purposes for which they are intended, it is to be understood that the invention is not limited to the precise construction set forth but that it includes within its purview such changes as fairly come within the spirit of the appended claims.

Having described our invention what we claim is:

1. A locking device for automobiles comprising a member formed of a single piece of metal and shaped to provide portions which underlie the spark and throttle lever segments, hooks extending upwardly from said portions which engage over the spark and throttle levers, portions extending rearwardly from the first named portions and steering wheel engaging means carried by the last named portions.

2. A locking device of the character described formed of a single and continuous piece of wire bent to provide spark and throttle lever engaging hooks, bends extending from said hooks adapted to pass beneath the spark and throttle lever segments, portions extending rearwardly from said bends and a transverse loop connecting the rear ends of the last named portions and adapted to embrace one of the spokes of the steering wheel.

3. A locking device of the character described formed of a single and continuous piece of wire bent to provide spark and throttle lever engaging hooks, bends extending from said hooks adapted to pass beneath the spark and throttle lever segments, portions extending rearwardly from said bends and a transverse loop connecting the rear ends of the last named portions and adapted to embrace one of the spokes of the steering wheel and additional loops between said portions and the transverse loop, said additional loops serving to receive a locking element.

4. A locking device of the character described formed of a single and continuous piece of wire bent to provide spark and throttle lever engaging hooks, bends extending from said hooks adapted to pass beneath the spark and throttle lever segments, portions extending rearwardly from said bends and a transverse loop connecting the rear ends of the last named portions and adapted to embrace one of the spokes of the steering wheel, additional loops between said portions and the transverse loop, said additional loops serving to receive a locking element and a member engaging the nut of the steering wheel and extending rearwardly from said nut and provided with eyes registering with said additional loops.

5. A locking device of the character described formed of a single and continuous piece of wire bent to provide spark and throttle lever engaging hooks, bends extending from said hooks adapted to pass beneath the spark and throttle lever segments, portions extending rearwardly from said bends, a transverse loop connecting the rear ends of the last named portions and adapted to embrace one of the spokes of the steering wheel, additional loops between said portions and the transverse loop, said additional loops serving to receive a locking element and a steering wheel locking means formed of a single and continuous piece of wire bent at its bight portion to form a nut engaging socket then bent to form a wheel hub engaging portion, then bent to form rearwardly extending portions having terminal eyes to register with the additional loops of the spark and throttle lever locking member.

6. A spark and throttle locking member comprising elements for engaging the spark and throttle levers, said member terminating in up-standing loops which lie upon opposite sides of one of the spokes of the steering wheel and a steering wheel locking member provided with elements for engaging the nut upon the steering wheel and having rearwardly extending portions terminating in eyes which register with said loops and a lock, the shackles of which traverses said loops and eyes.

In testimony whereof we affix our signatures.

ROBERT M. McMAHAN.
JOHN B. MAUGER.

Witnesses:
EDWIN PAUL,
JOHN Y. BUOY.

Copies of this patent may be obtained for five cents each, by addressing the "Commissioner of Patents, Washington, D. C."